June 10, 1924.

C. H. MADDUX 1,497,150

EDUCATIONAL DEVICE

Filed Feb. 20, 1923  3 Sheets-Sheet 1

Witnesses:
F. L. Fox.
N. Berman

C. H. Maddux,
INVENTOR.

BY Clarence A. O'Brien
ATTORNEY.

June 10, 1924.
C. H. MADDUX
1,497,150
EDUCATIONAL DEVICE
Filed Feb. 20, 1923
3 Sheets—Sheet 2
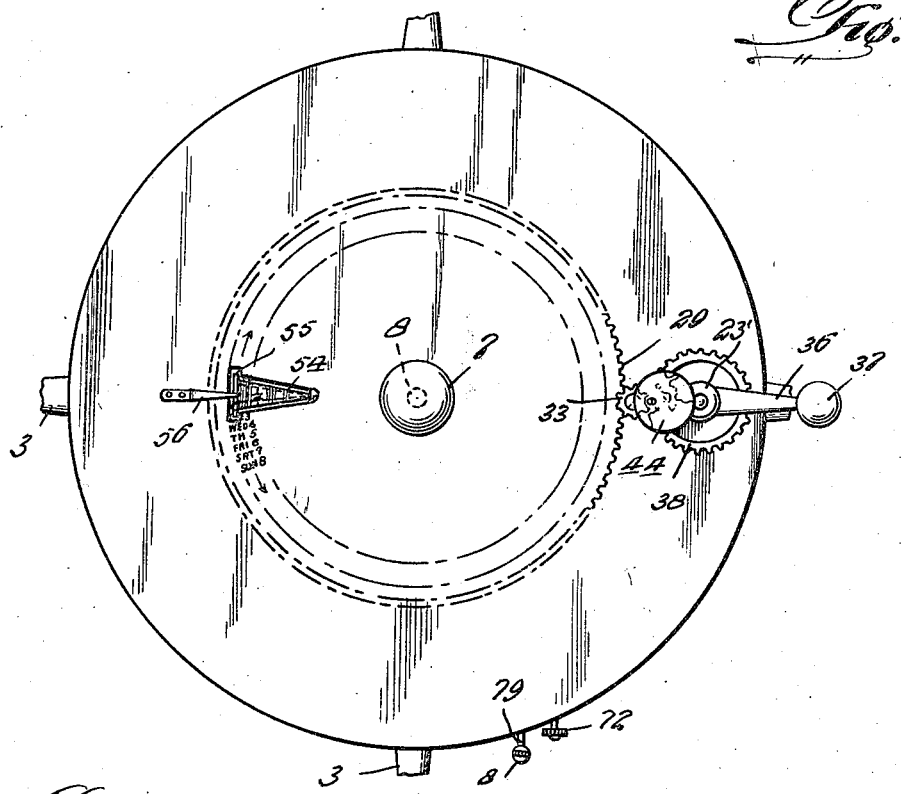
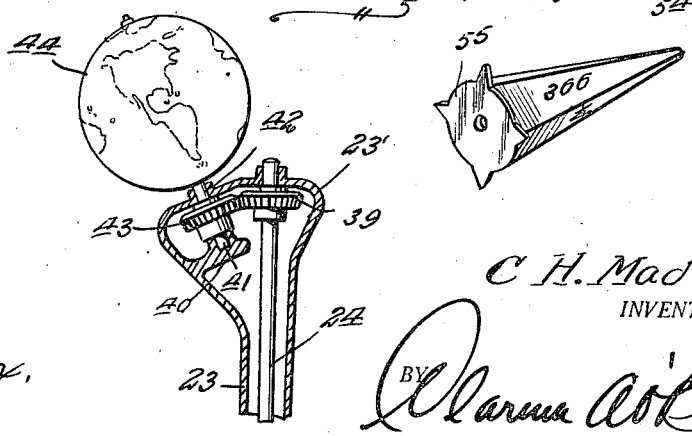
C. H. Maddux,
INVENTOR.
Witnesses:
BY
ATTORNEY.

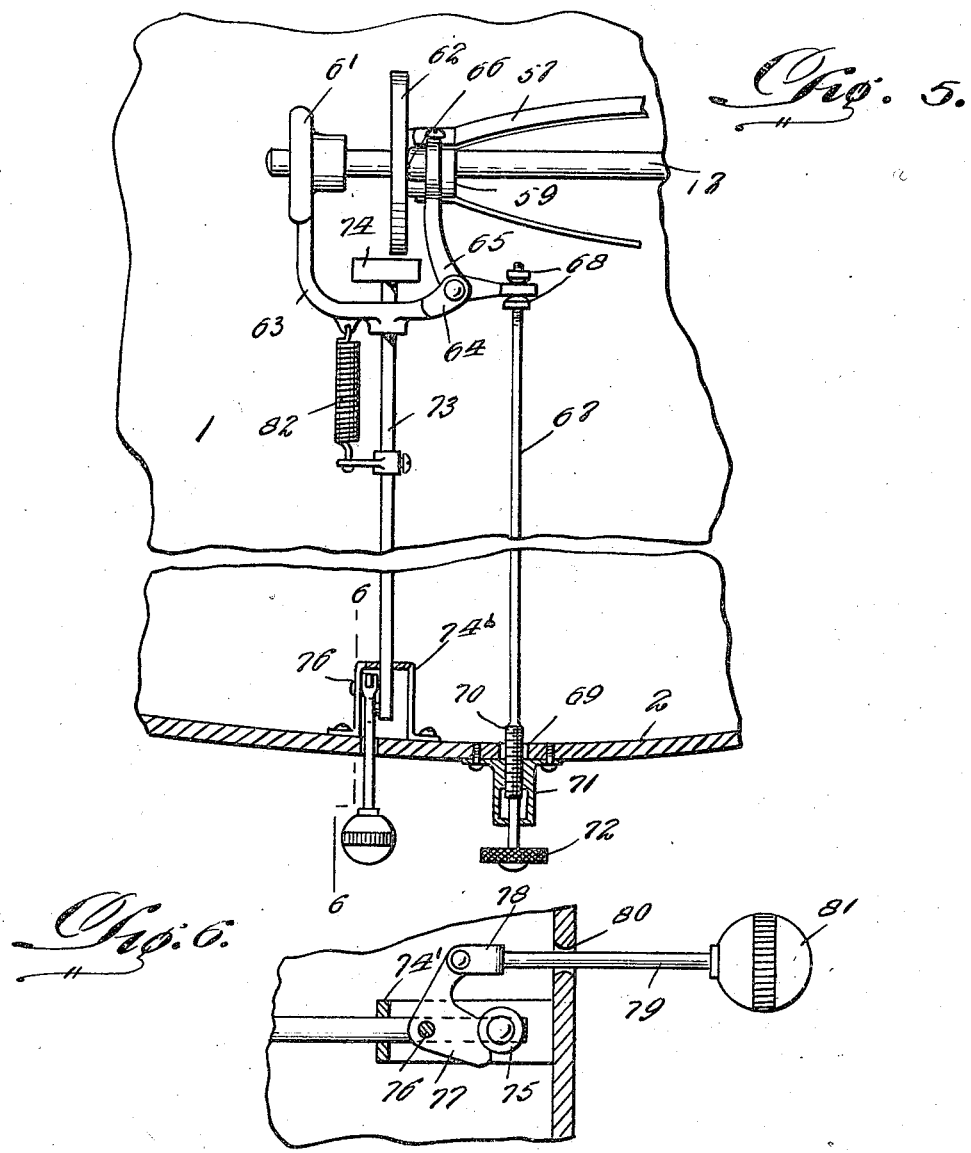

Patented June 10, 1924.

1,497,150

UNITED STATES PATENT OFFICE.

CLARENCE H. MADDUX, OF CADDO, OKLAHOMA.

EDUCATIONAL DEVICE.

Application filed February 20, 1923. Serial No. 620,134.

*To all whom it may concern:*

Be it known that I, CLARENCE H. MADDUX, a citizen of the United States, residing at Caddo, in the county of Bryan and State of Oklahoma, have invented certain new and useful Improvements in Educational Devices, of which the following is a specification.

My invention relates to educational devices, and has for the primary object thereof, the provision of such a device that will effectively instruct pupils and the like, of the relative position of the moon and earth with respect to the sun at all times of the year.

A further object of the invention is to provide my improved device with indicating means for determining the date of the year and the exact position of the moon and earth with respect to the sun on a certain date.

The nature and advantages of the invention will be better understood when the following detailed description is read in connection with the accompanying drawings, the invention residing in the construction, combination, and arrangement of parts as claimed.

In the drawings forming part of this application, like numerals of reference indicate similar parts in the several views, and wherein:—

Figure 1 is a cross sectional view of a device constructed in accordance with the present invention.

Figure 2 is a top plan view thereof.

Figure 3 is an enlarged fragmentary cross sectional view of a portion of my invention.

Figure 4 is an enlarged fragmentary sectional view of the supporting arm and the globe representing the earth.

Figure 5 is a section through the motor casing showing in top plan, a speed governor and stop for the motor.

Figure 6 is a sectional view upon the line 6—6 of Figure 5, and

Figure 7 is an indicator employed in connection with this invention.

Referring to the drawings, my device includes a relatively large annular casing including a bottom wall 1, and side wall 2. This casing is supported by a desirable form of leg support 3, and extending upwardly within the central portion of the casing and secured to the bottom wall 1 thereof, is a hollow standard 4 within the upper end of which is screwed the lower screw threaded end 5 of a hollow post 6. The upper end of this post 6 carries a transparent globe 7, within which is an electric lamp 8. This lamp 8 is electrically connected with a suitable source of electric energy such as a storage battery 9 supported upon the bottom wall 1 of the said casing.

Positioned slightly above the side wall 2 of the casing and engaging over the post 6 is a rotary plate 10, which cover has a central opening therein for receiving the said post 6, and formed around this opening is an upstanding collar 11 for purposes hereinafter described.

Properly supported upon the bottom wall 1 of the casing is a spring motor, including a spring barrel 12, winding shaft 13 having an operating handle 14 externally of the casing. This motor construction may be and preferably is, of any well known type, and the specific construction thereof does not enter into the scope of my invention. The spring within the barrel 12 is adapted to rotate a relatively large spur gear 15, meshing with a smaller gear 16 upon one end of a centrifugal governor shaft 17. Formed upon the shaft 17, and in close contact with the said small gear 16 thereon is a bevelled gear 18, which has intermeshing engagement with a bevelled ring gear 19, formed upon the undersurface of the said rotary cover 10.

Secured to the marginal edge of the cover 10, is a bracket arm 20, the forward end of which is raised from the disk 10, and has formed thereon a vertically extending sleeve 21. Received within the upper end of this sleeve 21 is the lower reduced end 22 of a vertically extending hollow tube 23. Vertically disposed within this tube and also within the sleeve 21 is a shaft 24, the lower end of which projects through the bottom end of the said sleeve and has a spur gear 25 keyed thereon. This gear 25 meshes with a relatively large gear 26 rotatably journaled upon a pin 27 secured to the before described rotary cover 10. This gear 26 has a central vertically extending gear 28 formed thereon for meshing with gear teeth 29 upon the edge of an annular stationary disk or plate 30.

This disk or plate 30 has a central opening therein for engaging over the post 6, which plate rests upon the before mentioned collar or sleeve 11 of the cover 10. Further, the plate 30 has a collar 31 formed around the central opening therein for receiving set screws or the like 32 adapted for engaging the post 6 for preventing rotation of the said plate 30. The sleeve gear 28 meshing with the gear teeth 29 upon the edge of the plate 30 has a relatively larger gear 33 formed at the upper end thereof, and engaging over the sleeve 21 of the bracket arm 20, and adapted to rotate therearound, is a collar 34, which has a laterally projecting arm 35 formed thereon, which arm extends upwardly at 36, and has connected to its upper end, a reflecting globe 37. The lower end of this collar 34 is formed with a large spur gear 38, for intermeshing with the said small gear 33 on the sleeve gear 28.

The upper end of the shaft 24 within the hollow tube 23 and sleeve 21 is journaled within the enlarged upper end 23' of the tube and has keyed thereto a bevelled gear 39. Journaled at its lower end within a bracket 40 formed within the enlarged upper end 23' of the tube 23 is a shaft 41, also extending outwardly through an opening 42 in this enlarged upper end and having keyed between the bracket 40 and opening of the tube a spur gear 43 for intermesh with the gear 39 on the shaft 24. This shaft 41 carries a globe 44 representing the world. As more clearly shown in Figure 4, the said shaft 41 functions as the world's axis and is inclined as shown.

The ratio of the gearing employed by me is such that when the spring motor is operating, the globe 44 will make a complete rotation every twenty-four hours, and at the same time, the globe supporting structure will revolve around the reflecting ball 7, representing the sun once every year. Furthermore, as the earth revolves around the sun, the reflecting globe 37 will revolve around the earth once every month. It is, of course, well known, that the earth in its action of revolving about the sun is always inclined in the same direction and as a means for maintaining the proper inclination of the globe 44, I have provided the upper end of the sleeve 21 carried by the bracket 20, with an arm 45, the outer end of which has a vertical bearing 46 formed thereon, for receiving therethrough, a pintle or shaft 47. The lower end of this pintle or shaft carries a spur gear 48 for meshing with teeth 49 formed upon the upper end of the collar 34 rotatably positioned on the sleeve 21. The upper end of this pintle or shaft 47 carries a smaller spur gear 50 having a hub for engaging the bearing 46 for mesh with a sleeve gear 51 keyed or otherwise secured to the world globe supporting tube 23. It will therefore be seen, that as the globe 44 revolves around the sun 7, and as the moon 37 revolves around the earth, the rotation of the collar 34 will rotate the said gear 49 and gear 50 for rotating said world carrying tube 23 for maintaining the earth at its proper inclination with respect to the sun 7.

As above set forth, the top plate or disk 30 is stationary upon the sun supporting standard 6, and the marginal edge of this plate has formed thereon indicating indicia representing thereon each day of the year. The stationary cover 10 carries a pointer 52 for overlying the marginal edge of the said plate 30 for indicating the exact day of the year as the cover 10 rotates.

Rotatably supported upon an arm 53 carried by the plate 30, and parallel therewith is a conical member 54 having a four cornered starting wheel 55 formed upon the outer enlarged end thereof. This conical member 54 is divided into four quarters, three of which have the numeral "365" formed thereon and the fourth quarter of which has the numeral "366". The pointer 52 has an arm 56 formed thereon, which arm 56 extends inwardly as shown for engaging one of the points of the starting wheel 55 every time the cover 10 makes a complete revolution, which is once every year for rotating the said conical member 54 for indicating the number of days in that specific year, it being understood that leap year occurring once every four years contains 366 days.

In Figures 5 and 6, I have shown a speed governing means and stop for the propeller shaft of the spring motor, and this means includes a series of spring arms 57 secured at one end to a collar 58 which is keyed to the speed governor shaft 17. The opposite ends of these spring arms 57 are secured to a similar collar 59 which is slidably disposed upon the shaft 17. As is well known, these spring arms 57 carry the usual type of weighted members 60 for contracting these arms when the shaft 17 is rotated for allowing the collar 59 to slide thereon. The outer end of the shaft 17 is journaled within a bearing 61, properly supported within the said casing and inwardly of the said bearing 61, is a friction disk 62 carried by the collar 59 and adapted to rotate and slide therewith upon the shaft 17. The bearing 61 is formed with an angular arm 63, the outer end 64 of which has, what may be termed a bell crank 65 pivotally secured thereto. One arm of this bell crank extends forwardly and overlies the said sliding collar 59. This end of the bell crank 65 carries a fiber knob 66 adapted for frictional engagement with the friction disk 62, when the same slides inwardly upon the shaft 17 due to the contraction of the spring arms 57. The other arm of the bell crank 65 has an opening therein, for receiving the screw threaded end of a rod 67, and this end of the rod is secured to the adjacent arm of the bell crank by nuts 68, the other end of the rod 67 extends through an opening 69 in the side wall 2 of the spring motor casing, and is screw threaded at 70 for screw threaded engagement within a sleeve or collar 71. The extreme outer end of this rod 67 has a thumb wheel 72 secured thereto, and it will therefore be seen that by screwing in a certain direction, this rod 67 and the fiber knob carrying arm of the bell crank 65 will be moved towards or away from the friction disk 62 for increasing or decreasing the speed of the propeller shaft 17.

The angular arm 63 formed upon the above mentioned bearing 61, has an opening therethrough for receiving one end of a sliding rod 73, and the extreme inner end of this rod carries a head 74 adjacent the periphery of the friction disk 62. The opposite end of this rod 73 extends through an opening within a U bracket 74' secured to the side wall 2 of the spring motor casing, and the end of this rod within the bracket carries a roller 75. Pivotally secured to one of the legs of the U bracket as at 76, is a bell crank 77, the lower end of which is suitably curved for engaging the said roller 75 on the rod 73. The upper arm of the bell crank 77 has pivotally secured thereto, the yoked end 78 of a sliding rod 79 engaging through an opening 80 in the side wall 2 of the spring motor casing. The outer end of this rod 79 carries a head 81, and it will be readily seen that by pushing forwardly upon the rod 79, the curved arm of the bell crank 77 will engage the roller 75 upon the end of the sliding rod 73 for retracting this said rod and for disengaging the head 74 from the friction disk 62. This head 74 is normally in engagement with the periphery of the disk 62, through the instrumentality of a coiled spring 82 secured at one end to the rod 73, and at the other end to the angular arm 63 of the bearing 61. The knob 81 and the parts operated thereby serve to prevent operation of the spring motor by the engagement of a head 74 with the disk 62.

In view of the above description, it will be readily seen that the cover 10 above the spring motor casing is adapted to make but a single revolution once every year, and this plate carrying the globe 44 and ball 37 representing, respectively, the earth and moon, will revolve about the sun. Further, through the instrumentality of the specific gearing, the earth will rotate on its axis 41, once every twenty-four hours, and the moon in the act of revolving around the sun, once every year will also revolve around the earth substantially once every thirty days for indicating at all times of the year, the exact position of the earth with respect to the moon and sun.

While I have herein shown and described the preferred embodiment of the present invention, it is nevertheless to be understood that minor changes may be made therein, without departing from the spirit and scope of the invention as claimed.

What I claim as new is:—

1. A device of the class described including an annular casing, a post arranged centrally thereof and extending above the casing and carrying a sun-representing globe, a cover for the casing rotatably mounted on said post, a stationary disc of smaller diameter than the casing mounted above the cover on the post, a bracket mounted on the cover beyond the periphery of the stationary disc, a moon supporting element rotatable on the bracket, a globe supporting element rotatable upon the bracket, a globe representation rotatable on the globe supporting element, a driving connection mounted on the cover engaging the stationary disc and operated by the relative movement of the cover to the disc for rotating the globe representation and the moon supporting element, and a second driving connection mounted on the bracket and driven by the moon supporting element for rotating the globe supporting element on the bracket.

2. A device of the class described including an annular casing, a post arranged centrally thereof extending above the casing and carrying a sun representing globe, a cover for the casing rotatably mounted on said post, a stationary disc of smaller diameter than the casing mounted above the cover on the post, a globe representing element, and a moon representing element each mounted for a predetermined relative movement on said cover and with the sun representing element, means for rotating the cover, the globe representing element, and the moon representing element, a day indicating element rotatably mounted in the stationary disc having indicia thereon indicating the number of days in respective years, means on the cover for operating said day indicating element in the rotation of the cover for indicating the number of days in each year represented by the relative rotation of the globe, moon, and sun indicating elements in their relative movement with each other during a period representing a year.

In testimony whereof I affix my signature.

CLARENCE H. MADDUX.